(12) United States Patent
Rong

(10) Patent No.: US 11,035,433 B2
(45) Date of Patent: Jun. 15, 2021

(54) MATRIX TYPE DOUBLE PARALLEL CAPILLARY TUBE SHOCK ABSORBER WITH A VARIABLE SYSTEM NATURAL FREQUENCY

(71) Applicant: SOUTH CHINA UNIVERSITY OF TECHNOLOGY, Guangzhou (CN)

(72) Inventor: Qiang Rong, Guangzhou (CN)

(73) Assignee: SOUTH CHINA UNIVERSITY OF TECHNOLOGY, Guangzhou (CN)

( * ) Notice: Subject to any disclaimer, the term of this patent is extended or adjusted under 35 U.S.C. 154(b) by 55 days.

(21) Appl. No.: 16/470,267

(22) PCT Filed: Nov. 28, 2017

(86) PCT No.: PCT/CN2017/113373
§ 371 (c)(1),
(2) Date: Jun. 17, 2019

(87) PCT Pub. No.: WO2018/121161
PCT Pub. Date: Jul. 5, 2018

(65) Prior Publication Data
US 2020/0088263 A1    Mar. 19, 2020

(30) Foreign Application Priority Data
Dec. 27, 2016  (CN) .......................... 201611223458.9

(51) Int. Cl.
*F16F 9/34*      (2006.01)
*F16F 13/00*     (2006.01)

(52) U.S. Cl.
CPC .............. *F16F 13/007* (2013.01); *F16F 9/34* (2013.01); *F16F 2228/04* (2013.01)

(58) Field of Classification Search
CPC ....... F16F 5/00; F16F 9/34; F16F 9/53; B60G 17/015

(Continued)

(56) References Cited

U.S. PATENT DOCUMENTS 4,811,919 A * 3/1989 Jones ...................... F01D 25/28
244/54
4,936,423 A * 6/1990 Karnopp ............ B60G 17/0152
137/625.47

(Continued)

FOREIGN PATENT DOCUMENTS

CN      1367328 A     9/2002
CN      1699781 A     11/2005
(Continued)

*Primary Examiner* — Christopher P Schwartz
(74) *Attorney, Agent, or Firm* — JMB Davis Ben-David

(57) ABSTRACT

Provided is a matrix type double parallel capillary tube shock absorber with a variable system natural frequency, wherein on a pipeline between oil supply ports of an upper oil compartment (14) and a lower oil compartment (16), a capillary tube parallel type damping associated section and a capillary tube parallel type system natural frequency associated section are successively connected from top to bottom; the capillary tube parallel type damping associated section comprises four capillary tubes connected in parallel, with each capillary tube being connected in series with a solenoid valve so as to control the operation of the capillary tube; the capillary tube parallel type system natural frequency associated section comprises four capillary tubes connected in parallel, and each of the four capillary tubes is connected in series with a solenoid valve so as to control the operation of the capillary tube; the diameter of the smallest capillary tube of the frequency adjustment section is much larger than the diameter of the capillary tube of the resistance adjustment section; and in a matrix type operation state table, the configuration value $S_{mn}$ of the solenoid valves of the frequency adjustment section is selected according to situations, and by way of changing the mass, the problem of the system natural frequency of a hydraulic shock absorber for a vehicle being not adjustable or having a small adjustable range can be solved. Further provided is a method for (Continued)

operating a matrix type double parallel capillary tube shock absorber with a variable system natural frequency.

10 Claims, 3 Drawing Sheets

(58) Field of Classification Search
USPC ......... 188/313, 314, 318, 322.13; 280/5.515, 280/124.161
See application file for complete search history.

(56) References Cited

U.S. PATENT DOCUMENTS

| | | | | |
|---|---|---|---|---|
| 5,682,980 | A * | 11/1997 | Reybrouck | B60G 17/04 280/124.16 |
| 6,129,368 | A | 10/2000 | Ishikawa | |
| 6,669,208 | B1 * | 12/2003 | Monk | B60G 11/30 280/5.506 |
| 6,755,113 | B2 * | 6/2004 | Shih | F15B 1/021 91/5 |
| 8,210,330 | B2 * | 7/2012 | Vandewal | B60G 17/08 188/313 |
| 8,651,251 | B2 * | 2/2014 | Preukschat | F16F 9/512 188/282.4 |

FOREIGN PATENT DOCUMENTS

| | | |
|---|---|---|
| CN | 102518733 | 6/2012 |
| CN | 102518733 A | 6/2012 |
| CN | 103644248 | 3/2014 |
| CN | 103711827 | 4/2014 |
| CN | 103711827 A | 4/2014 |
| CN | 106763437 | 5/2017 |
| CN | 106763437 A | 5/2017 |
| CN | 106763451 | 5/2017 |
| CN | 106763451 A | 5/2017 |
| CN | 206419416 | 8/2017 |
| CN | 206419416 U | 8/2017 |
| CN | 106763451 B | 5/2019 |
| JP | H11230233 | 8/1999 |
| JP | H11230233 A | 8/1999 |

* cited by examiner

MATRIX TYPE DOUBLE PARALLEL CAPILLARY TUBE SHOCK ABSORBER WITH A VARIABLE SYSTEM NATURAL FREQUENCY

CROSS-REFERENCE TO RELATED APPLICATIONS

This is the U.S. National Stage of International Patent Application No. PCT/CN2017/113373 filed Nov. 28, 2017, which was published in Chinese under PCT Article 21(2), and which in turn claims the benefit of China Patent Application No. 201611223458.9 filed Dec. 27, 2016.

TECHNICAL FIELD

The present invention relates to the field of hydraulic shock absorbers for vehicles, and in particularly to a matrix type double parallel capillary tube shock absorber with a variable system natural frequency.

BACKGROUND ART

There are mainly hydraulic, pneumatic and electromagnetic shock absorbing methods for vehicles. At present, the hydraulic shock absorbing method is the most widely used in vehicles. The system natural frequency of the hydraulic shock absorber is an important performance indicator of the shock absorber for the vehicle. At present, one of the disadvantages of the performance of the hydraulic shock absorber is that the system natural frequency of the shock absorber is not adjustable or has a small adjustable range.

The quality of the system natural frequency of the hydraulic shock absorber for the vehicle will directly affect the vibration amplitude, comfort and smoothness of the vehicle during traveling.

It is well known that for an ideal spring oscillator, as shown in FIG. 1, the system natural frequency of the spring oscillator is inversely proportional to the square root of the mass of a ball of the spring oscillator. That is to say, when the mass of the ball is changed, the system natural frequency will change. The smaller the mass of the ball, the higher the system natural frequency. The higher the mass of the ball, the lower the system natural frequency.

As shown in FIG. 2, four capillary tubes are capillary tubes R8, R4, R2 and R1, respectively; and they are of equal length and are respectively connected to solenoid valves $V_{R8}$, $V_{R4}$, $V_{R2}$ and $V_{R1}$ in series so as to control their operation. The ratio of the cross-sectional areas of the four capillary tubes is 8:4:2:1; that is, their cross-sectional areas are arranged according to a binary coding rule of 8421.

As shown in FIG. 2, the configuration $S_{Rn}$ of the solenoid valves $V_{R8}$, $V_{R4}$, $V_{R2}$, and $V_{R1}$ of the shock absorber will be determined according to the damping requirements (the range of values of n is 0, 1, 2, . . . , 15, where $S_{R0}$ indicates that the solenoid valves $V_{R8}$, $V_{R4}$, $V_{R2}$, and $V_{R1}$ are all turned off; $S_{R1}$ indicates that only $V_{R1}$ among $V_{R8}$, $V_{R4}$, $V_{R2}$, and $V_{R1}$ is turned on, and the rest are turned off; $S_{R2}$ indicates that only $V_{R2}$ is turned on, and the rest is turned off; $S_{R3}$ indicates that only $V_{R2}$ and $V_{R1}$ are turned on, and the rest are turned off; and so on for $S_{R4}$ to $S_{R15}$). When the configuration $S_{Rn}$ is determined, the mass $M_{Rn}$ of a fluid in the shock absorber that participates in the oscillation for shock absorption is also determined. Compared with the spring oscillator, the mass $M_{Rn}$ is similar to the mass of the ball of the spring oscillator. Therefore, at this time, the system natural frequency of the shock absorber is then determined, so the natural frequency is not adjustable in the determined configuration $S_{Rn}$.

SUMMARY OF THE INVENTION

An object of the present invention is, in order to overcome the above-mentioned shortcomings and drawbacks of the prior art, to provide a matrix type double parallel capillary tube shock absorber with a variable system natural frequency, which aims to improve the system natural frequency characteristics of a hydraulic shock absorber for a vehicle.

The present invention is achieved by the following technical solutions:

a matrix type double parallel capillary tube shock absorber with a variable system natural frequency, which comprises a vehicle frame 11, an axle 17 and a hydraulic cylinder 13, an upper end of the hydraulic cylinder 13 being connected to the vehicle frame 11 via a piston rod of the hydraulic cylinder, and a lower end of a cylinder body of the hydraulic cylinder 13 being connected to the axle 17; and a piston 15 inside the hydraulic cylinder 13 dividing the hydraulic cylinder 13 into an upper oil compartment 14 and a lower oil compartment 16;

wherein on a pipeline between oil supply ports of the upper oil compartment 14 and the lower oil compartment 16, a capillary tube parallel type damping associated section 21 and a capillary tube parallel type system natural frequency associated section 22 are successively connected from top to bottom, that is, an oil port D of the capillary tube parallel type damping associated section 21 is connected 23 to an oil port A of the upper oil compartment 14, an oil port C of the capillary tube parallel type damping associated section 21 is connected 25 to an oil port G of the capillary tube parallel type system natural frequency associated section 22, and an oil port H of the capillary tube parallel type system natural frequency associated section 22 is connected 24 to an oil port B of the lower oil compartment 16.

The capillary tube parallel type damping associated section 21 comprises four capillary tubes successively connected in parallel, with each capillary tube being connected in series with a solenoid valve; and the function of the solenoid valve is to control the turning on and the turning off of the capillary tube.

The capillary tube parallel type system natural frequency associated section 22 comprises four capillary tubes connected in parallel, and the four capillary tubes are each connected in series with a solenoid valve; and the function of the solenoid valve is to control the turning on and the turning off of the capillary tube.

A capillary tube parallel-connection end of the capillary tube parallel type system natural frequency associated section is the oil port G, and a solenoid valve parallel-connection end is the oil port H.

The lengths of the four capillary tubes of the capillary tube parallel type system natural frequency associated section are equal.

The ratio of the cross-sectional areas of the four capillary tubes of the capillary tube parallel type system natural frequency associated section is 8:4:2:1, that is, their cross-sectional areas are arranged according to a binary coding rule of 8421.

Among the four capillary tubes of the capillary tube parallel type system natural frequency associated section, the diameter $d_{m1}$ of the smallest capillary m1 is not less than twice the diameter $d_{R8}$ of the largest capillary tube R8 of the capillary tube parallel type damping associated section.

The capillary tubes in the capillary tube parallel type damping associated section and the capillary tube parallel type system natural frequency associated section are all formed into an "M" shape, an "S" shape or a spiral shape.

The solenoid valves in the capillary tube parallel type damping associated section and the capillary tube parallel type system natural frequency associated section are further connected to a capillary tube control system 26; and the capillary tube control system 26 is configured to control the turning on and the turning off of each solenoid valve.

A spring 12 is provided between the vehicle frame 11 and the axle 17.

A method for operating the matrix type double parallel capillary tube shock absorber with a variable system natural frequency of the present invention comprises the following steps:

when a relative movement between the vehicle frame and the axle occurs, the piston correspondingly moves up or down, and at this time, an oily liquid in the hydraulic cylinder 13 passes through the capillary tube parallel type damping associated section and the capillary tube parallel type system natural frequency associated section between the oil port A and the oil port B, and then flows from the upper oil compartment 14 to the lower oil compartment 16, or from the lower oil compartment 16 to the upper oil compartment 14;

due to the viscous effect of the oily liquid in the cylinder body, when the oily liquid flows through the capillary tube parallel type damping associated section, the capillary tubes operating in the capillary tube parallel type damping associated section dampen the flow of the oily liquid, thereby forming a resistance against the movement of the piston, wherein the magnitude of the resistance is controlled by the capillary tube control system based on the configuration $S_{Rn}$ of the solenoid valves, thereby realizing the resistance adjustment for the capillary tube parallel type damping associated section; and when the oily liquid flows through the capillary tube parallel type system natural frequency associated section, with the capillary tube control system changing the configuration $S_{mn}$ of the solenoid valves, the system natural frequency of the shock absorber can be adjusted, thereby realizing the frequency adjustment for the capillary tube parallel type system natural frequency associated section.

The method for operating the shock absorber of the present invention is further illustrated below:

when a relative movement between the vehicle frame and the axle occurs, the piston correspondingly moves up or down, and at this time, an oily liquid in the hydraulic cylinder 13 passes through the capillary tube parallel type damping associated section (hereinafter referred to as resistance adjustment section) and the capillary tube parallel type system natural frequency associated section (hereinafter referred to as frequency adjustment section) between the oil port A and the oil port B, and then flows from the upper oil compartment 14 to the lower oil compartment 16, or from the lower oil compartment 16 to the upper oil compartment 14.

Due to the viscous effect of the oily liquid in the cylinder body, when the oily liquid flows through the resistance adjustment section, the capillary tubes of the resistance adjustment section will dampen the flow of the oily liquid, thereby forming a resistance against the movement of the piston, wherein the magnitude of the resistance is controlled by the capillary tube control system based on the configuration $S_{Rn}$ of the solenoid valves, thereby realizing the resistance adjustment for the resistance adjustment section.

After the configuration $S_{Rn}$ of the resistance adjustment section of the shock absorber is determined according to the damping requirements, the configuration $S_{mn}$ of the solenoid valves $V_{m8}$, $V_{m4}$, $V_{m2}$ and $V_{m1}$ of the frequency adjustment section of the shock absorber will be determined according to the requirements for the natural frequency. For $S_{mn}$, the range of values of n is 0, 1, 2, ..., 15, where $S_{m0}$ indicates that the solenoid valves $V_{m8}$, $V_{m4}$, $V_{m2}$ and $V_{m1}$ are all turned off; $S_{m0}$ indicates that only $V_{m1}$ among $V_{m8}$, $V_{m4}$, $V_{m2}$ and $V_{m1}$ is turned on, and the rest is turned off; $S_{m2}$ indicates that only $V_{m2}$ is turned on, and the rest is turned off; $S_{m3}$ indicates that only $V_{m2}$ and $V_{m1}$ are turned on, and the rest are turned off; and so on for $S_{m4}$ to $S_{m15}$.

When the configuration $S_{mn}$ of the frequency adjustment section is determined, the mass $M_{mn}$ of a fluid participating in the oscillation in the frequency adjustment section is also determined. Accordingly, the mass of the fluid in the shock absorber that participates in the oscillation for shock absorption is $M_{Rn}+M_{mn}$ (where $M_{Rn}$ is the mass of the fluid participating in the oscillation in the resistance adjustment section). Compared with a spring oscillator, the combined mass of the masses $M_{Rn}$ and $M_{mn}$ is similar to the mass of the ball of the spring oscillator. We change the combined mass of $M_{Rn}$ and $M_{mn}$ by changing $M_{mn}$ so as to change the system natural frequency of the shock absorber.

Since the diameters of the capillary tubes of the frequency adjustment section are all much larger than the diameters of the capillary tubes of the resistance adjustment section, the loss of pressure head of the frequency adjustment section is much smaller than that of the resistance adjustment section. In this way, the damping of the shock absorber mainly is the damping of the resistance adjustment section, so that the capillary tube parallel type damping associated section is also referred to as the resistance adjustment section. Further, since the frequency adjustment section has little effect on the damping, but it can change the system natural frequency of the shock absorber, the capillary tube parallel type system natural frequency associated section is referred to as the frequency adjustment section. Further, since the resistance adjustment section is adjusted by parallel capillary tubes, and the frequency adjustment section is also adjusted by parallel capillary tubes, the system is a double parallel capillary tube shock absorber (the first "parallel" indicates that the operation mode of the resistance adjustment section is a parallel mode, and the second "parallel" indicates that the operation mode of the frequency adjustment section is also a parallel mode).

Since the damping of the frequency adjustment section is small and the diameter of the capillary tube of the frequency adjustment section is relatively large, we can easily make $M_{mn}$ much larger than $M_{Rn}$ by increasing the length of the capillary tube of the frequency adjustment section, so that the adjustment range of the system natural frequency of the shock absorber can be made very large.

The resistance adjustment section and the frequency adjustment section of the shock absorber operate in series, and the state of the resistance adjustment section is determined based on the configuration $S_{Rn}$, and the state of the frequency adjustment section is determined based on the configuration $S_{mn}$. Therefore, the operation state of the shock absorber can be expressed by the following table.

Theoretical operation state table of the shock absorber:

| $S_{Rn}$ | $S_{mn}$ | | | | | | |
|---|---|---|---|---|---|---|---|
| | $S_{m0}$ | $S_{m1}$ | $S_{m2}$ | ... $S_{m13}$ | $S_{m14}$ | $S_{m15}$ | |
| $S_{R0}$ | $(S_{R0}\ S_{m0})$ | $(S_{R0}\ S_{m1})$ | $(S_{R0}\ S_{m2})$ | ... $(S_{R0}\ S_{m13})$ | $(S_{R0}\ S_{m14})$ | $(S_{R0}\ S_{m15})$ |
| $S_{R1}$ | $(S_{R1}\ S_{m0})$ | $(S_{R1}\ S_{m1})$ | $(S_{R1}\ S_{m2})$ | ... $(S_{R1}\ S_{m13})$ | $(S_{R1}\ S_{m14})$ | $(S_{R1}\ S_{m15})$ |
| $S_{R2}$ | $(S_{R2}\ S_{m0})$ | $(S_{R2}\ S_{m1})$ | $(S_{R2}\ S_{m2})$ | ... $(S_{R2}\ S_{m13})$ | $(S_{R2}\ S_{m14})$ | $(S_{R2}\ S_{m15})$ |
| | | | | | | |
| $S_{R13}$ | $(S_{R13}\ S_{m0})$ | $(S_{R13}\ S_{m1})$ | $(S_{R13}\ S_{m2})$ | ... $(S_{R13}\ S_{m13})$ | $(S_{R13}\ S_{m14})$ | $(S_{R13}\ S_{m15})$ |
| $S_{R14}$ | $(S_{R14}\ S_{m0})$ | $(S_{R14}\ S_{m1})$ | $(S_{R14}\ S_{m2})$ | ... $(S_{R14}\ S_{m13})$ | $(S_{R14}\ S_{m14})$ | $(S_{R14}\ S_{m15})$ |
| $S_{R15}$ | $(S_{R15}\ S_{m0})$ | $(S_{R15}\ S_{m1})$ | $(S_{R15}\ S_{m2})$ | ... $(S_{R15}\ S_{m13})$ | $(S_{R15}\ S_{m14})$ | $(S_{R15}\ S_{m15})$ |

The value content in the above table can be taken as a 16×16 matrix, the elements of which are $(S_{Rn}, S_{mn})$. Therefore, the present invention simply and clearly expresses the theoretical operation states of the shock absorber in a matrix manner, so that the system of the present invention is referred to as a matrix type double parallel capillary tube shock absorber with a variable system natural frequency for a vehicle.

The configurations $S_{Rn}$, $S_{mn}$ of the various solenoid valves in the resistance adjustment section and the frequency adjustment section are all controlled by the capillary tube control system of the shock absorber.

In the above matrix, the occurrence of $S_{R0}$, $S_{m0}$ states should be minimized in an actual operation, because these states have a greater influence on the service life of the shock absorber.

Since the adjustment range of $M_{mn}$ of the frequency adjustment section is very large, the range of changes in the system natural frequency of the shock absorber is also very large. Therefore, the problem of the system natural frequency of the hydraulic shock absorber being not adjustable or having a small adjustable range is solved.

Compared with the prior art, the present invention has the following advantages and effects:

The present invention solves the problem of the system natural frequency of the hydraulic shock absorber being not adjustable or having a small adjustable range by changing the configuration $S_{mn}$ of the solenoid valves of the frequency adjustment section.

The present invention has the advantages of ingenious design, low costs, and simple and convenient technical means. The present invention constructs an actuation mechanism for digitally adjusting the system natural frequency of the shock absorber with a simple mechanical structure, and simply and clearly expresses the theoretical operation states of the shock absorber in a matrix manner; which greatly improves the quality of the system natural frequency of the hydraulic shock absorber, and has positive and outstanding beneficial effects on the development of modern vehicle shock absorbing technology.

DETAILED DESCRIPTION OF EMBODIMENTS

The present invention will be further described in detail below in conjunction with particular embodiments.

EMBODIMENTS

Figure 1:
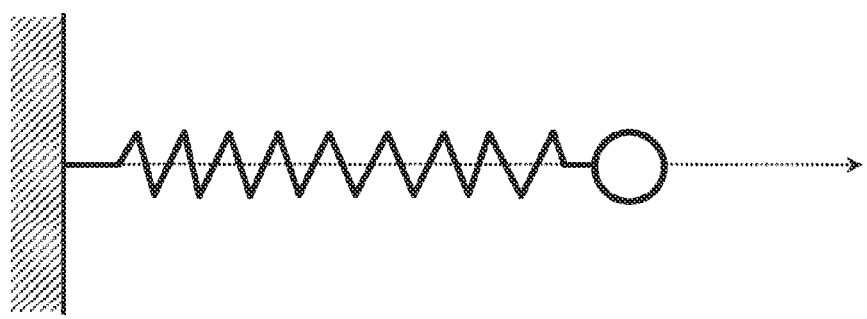
FIG. 1 is a schematic view of an existing spring oscillator.
Figure 2:
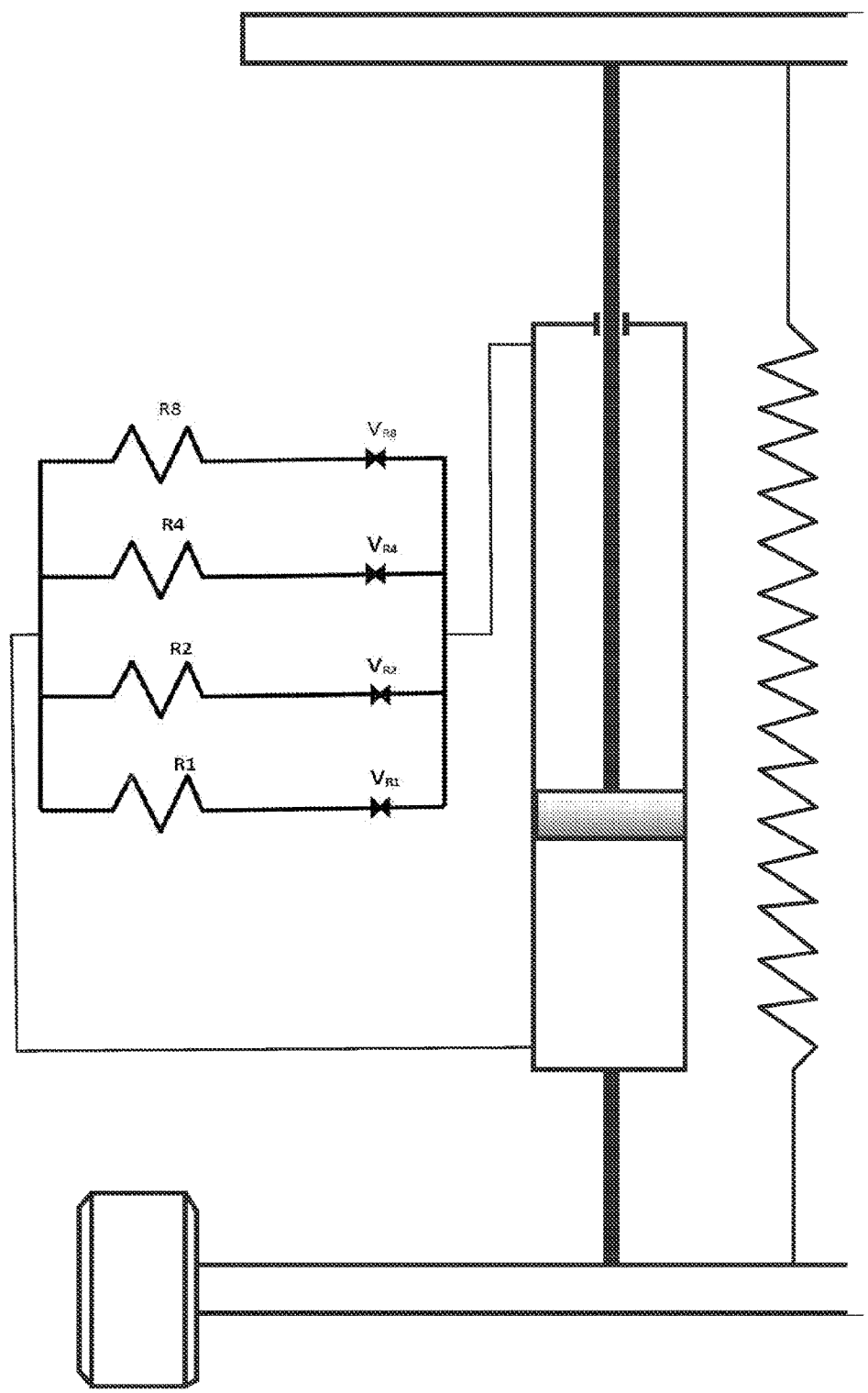
FIG. 2 is a schematic structural view of an existing parallel capillary tube shock absorber with variable damping for a vehicle.

See the background art section for related content in FIGS. 1 and 2.

Figure 3:
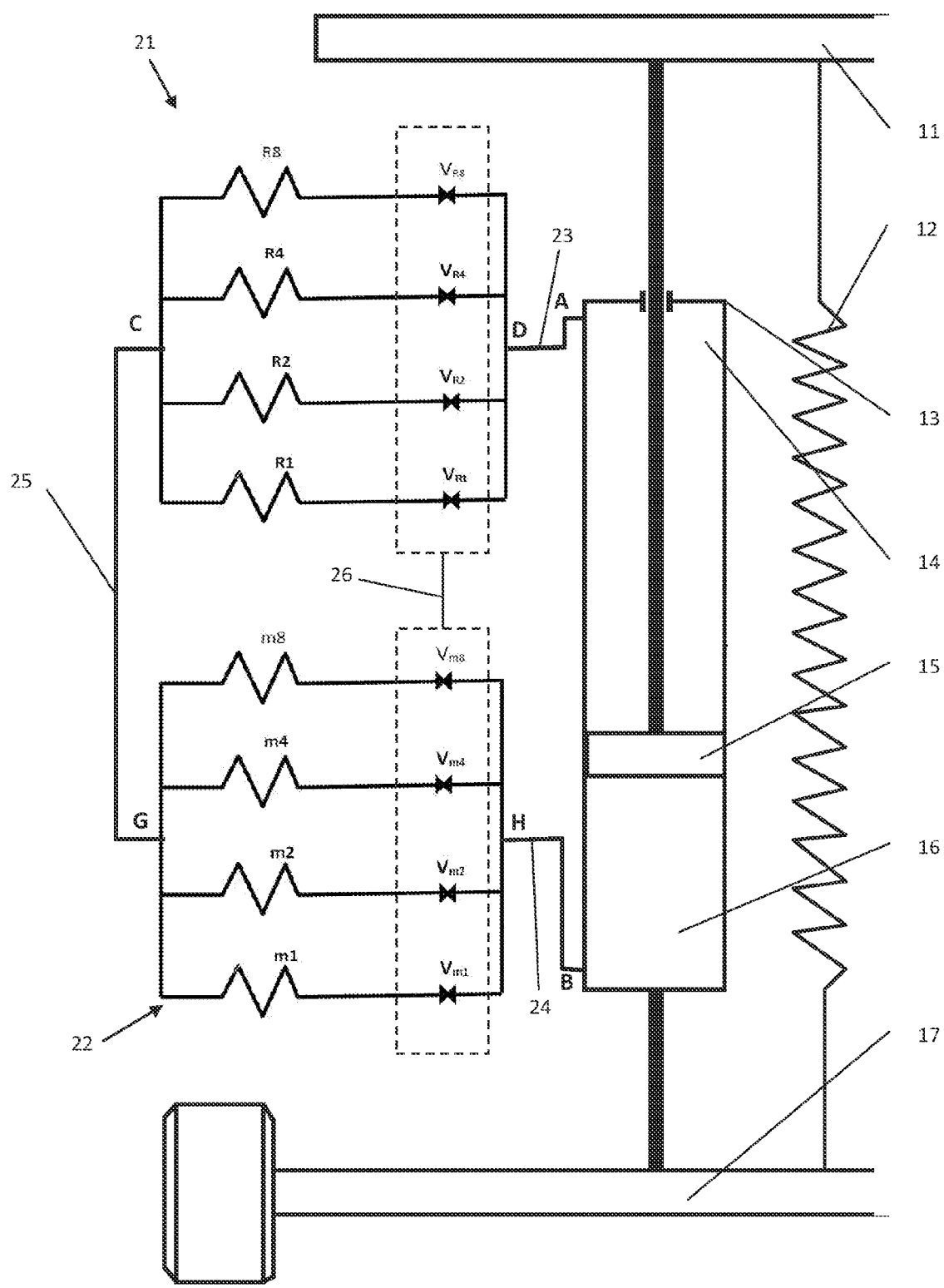
FIG. 3 is a schematic structural view of a matrix type double parallel capillary tube shock absorber with a variable system natural frequency according to the present invention.

As shown in FIG. 3, a resistance adjustment section comprises four capillary tubes, which are R8, R4, R2 and R1 respectively. They are of equal length and are respectively connected to solenoid valves $V_{R8}$, $V_{R4}$, $V_{R2}$ and $V_{R1}$ in series so as to control their operation. The ratio of the cross-sectional areas of the four capillary tubes is 8:4:2:1; and they are all $L_R$ in length.

A frequency adjustment section comprises four capillary tubes, which are m8, m4, m2 and m1 respectively. They are of equal length and are respectively connected to solenoid valves $V_{m8}$, $V_{m4}$, $V_{m2}$ and $V_{m1}$ in series so as to control their operation. The ratio of the cross-sectional areas of the four capillary tubes is 8:4:2:1; and they are all $L_m$ in length. In this embodiment, the length $L_m$ of these four capillary tubes is equal to the length $L_R$ of the capillary tubes of the resistance adjustment section. The diameter $d_{m1}$ of the smallest capillary tube m1 among these four capillary tubes is equal to 4 times the diameter $d_{R8}$ of the maximum capillary tube R8 of the resistance adjustment section.

After the configuration $S_{Rn}$ of the resistance adjustment section of the shock absorber is determined according to the damping requirements, the configuration $S_{mn}$ of the solenoid valves $V_{m8}$, $V_{m4}$, $V_{m2}$ and $V_{m1}$ of the frequency adjustment section of the shock absorber will be determined according to the requirements for the natural frequency. When the configuration $S_{mn}$ of the frequency adjustment section is determined, the mass $M_{mn}$ of a fluid participating in the oscillation in the frequency adjustment section is also determined. Accordingly, the mass of the fluid in the shock absorber that participates in the oscillation for shock absorption is $M_{Rn}+M_{mn}$ (where $M_{Rn}$ is the mass of the fluid participating in the oscillation in the resistance adjustment section). Compared with a spring oscillator, the combined mass of the masses $M_{Rn}$ and $M_{mn}$ is similar to the mass of the ball of the spring oscillator. We change the combined mass of $M_{Rn}$ and $M_{mn}$ by changing $M_{mn}$ so as to change the system natural frequency of the shock absorber.

In this embodiment, since the diameter $d_{m1}=4d_{R8}$, and $L_m=L_R$, the loss of pressure head of the frequency adjustment section is much smaller than that of the resistance adjustment section. Further, since the diameter $d_{m1}=4d_{R8}$, and $L_m=L_R$, $M_{mn}$ of the frequency adjustment section is much larger than $M_{Rn}$ of the resistance adjustment section, so that the adjustment range of the system natural frequency of the shock absorber is very large.

As described above, the present invention can be preferably implemented.

The implementations of the present invention are not limited to the above-described embodiments, and any other changes, modifications, substitutions, combinations, and simplifications that are made without departing from the spirit and scope of the present invention should be equivalent replacements, and are all within the scope of protection of the present invention.

The invention claimed is:

1. A matrix type double parallel capillary tube shock absorber with a variable system natural frequency, which comprises a vehicle frame (11), an axle (17) and a hydraulic cylinder (13), an upper end of the hydraulic cylinder (13) being connected to the vehicle frame (11) via a piston rod of the hydraulic cylinder, and a lower end of a cylinder body of the hydraulic cylinder (13) being connected to the axle (17); and a piston (15) inside the hydraulic cylinder (13) dividing the hydraulic cylinder (13) into an upper oil compartment (14) and a lower oil compartment (16); wherein on a pipeline between oil supply ports of the upper oil compartment (14) and the lower oil compartment (16), a capillary tube parallel type damping associated section and a capillary tube parallel type system natural frequency associated section are successively connected from top to bottom, that is, a first oil port provided in the capillary tube parallel type damping associated section is connected to a second oil port provided on the upper oil compartment (14), a third oil port provided in the capillary tube parallel type damping associated section is connected to a fourth oil port provided in the capillary tube parallel type system natural frequency associated section, and a fifth oil port provided in the capillary tube parallel type system natural frequency associated section is connected to a sixth oil port provided on the lower oil compartment (16);

wherein the capillary tube parallel type damping associated section provides resistance adjustments for the shock absorber; and wherein the capillary tube parallel type system natural frequency associated section provides natural frequency adjustments of the shock absorber.

2. The matrix type double parallel capillary tube shock absorber with a variable system natural frequency of claim 1, wherein the capillary tube parallel type damping associated section comprises four capillary tubes successively connected in parallel, with each capillary tube being connected in series with a solenoid valve; and the capillary tube parallel type system natural frequency associated section comprises four capillary tubes connected in parallel, and the four capillary tubes are each connected in series with a solenoid valve.

3. The matrix type double parallel capillary tube shock absorber with a variable system natural frequency of claim 2, wherein a capillary tube parallel-connection end of the capillary tube parallel type system natural frequency associated section is the fourth oil port, and a solenoid valve parallel-connection end is the fifth oil port.

4. The matrix type double parallel capillary tube shock absorber with a variable system natural frequency of claim 2, wherein the lengths of the four capillary tubes of the capillary tube parallel type system natural frequency associated section are equal.

5. The matrix type double parallel capillary tube shock absorber with a variable system natural frequency of claim 2, wherein the ratio of the cross-sectional areas of the four capillary tubes of the capillary tube parallel type system natural frequency associated section is 8:4:2:1, that is, their cross-sectional areas are arranged according to a binary coding rule of 8421.

6. The matrix type double parallel capillary tube shock absorber with a variable system natural frequency of claim 5, wherein among the four capillary tubes of the capillary tube parallel type system natural frequency associated section, the diameter $d_{m1}$ of the smallest capillary m1 is not less than twice the diameter $d_{R8}$ of the largest capillary tube R8 of the capillary tube parallel type damping associated section.

7. The matrix type double parallel capillary tube shock absorber with a variable system natural frequency of any one of claims 1 to 6, wherein the capillary tubes in the capillary tube parallel type damping associated section and the capillary tube parallel type system natural frequency associated section are all formed into an "M" shape, an "S" shape or a spiral shape.

8. The matrix type double parallel capillary tube shock absorber with a variable system natural frequency of claim 7, wherein the solenoid valves in the capillary tube parallel type damping associated section and the capillary tube parallel type system natural frequency associated section are further connected to a capillary tube control system; and the capillary tube control system is configured to control the turning on and the turning off of each solenoid valve.

9. The matrix type double parallel capillary tube shock absorber with a variable system natural frequency of claim 7, a spring (12) is provided between the vehicle frame (11) and the axle (17).

10. A method for operating the matrix type double parallel capillary tube shock absorber with a variable system natural frequency of claim 1, comprising the following steps:

when a relative movement between the vehicle frame and the axle occurs, a piston correspondingly moves up or down, and an oily liquid in the hydraulic cylinder (13) passes through a capillary tube parallel type damping associated section and a capillary tube parallel type system natural frequency associated section between a first oil port and a second oil port, and then flows from the upper oil compartment (14) to the lower oil compartment (16), or from the lower oil compartment (16) to the upper oil compartment (14);

when the oily liquid flows through the capillary tube parallel type damping associated section, the capillary tubes operating in the capillary tube parallel type damping associated section dampen the flow of the oily liquid due to the viscous effect of the oily liquid in the cylinder body, thereby forming a resistance against the movement of the piston; wherein the magnitude of the resistance is controlled by a capillary tube control system based on a $S_{Rn}$, configuration of the solenoid valves to provide a resistance adjustment for the capillary tube parallel type damping associated section; and when the oily liquid flows through the capillary tube parallel type system natural frequency associated section, with the capillary tube control system changing a $S_{mn}$ configuration of the solenoid valves, the system natural frequency of the shock absorber is adjustable to provide a frequency adjustment for the capillary tube parallel type system natural frequency associated section.

\* \* \* \* \*